US007032032B2

(12) United States Patent
Loprieno

(10) Patent No.: US 7,032,032 B2
(45) Date of Patent: Apr. 18, 2006

(54) METHOD AND APPARATUS FOR PROVIDING TANDEM CONNECTION, PERFORMANCE MONITORING, AND PROTECTION ARCHITECTURES OVER ETHERNET PROTOCOLS

(75) Inventor: Gilberto Loprieno, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 10/630,592

(22) Filed: Jul. 29, 2003

(65) Prior Publication Data

US 2005/0028043 A1 Feb. 3, 2005

(51) Int. Cl.
*G06F 15/16* (2006.01)

(52) U.S. Cl. .................. 709/246; 709/224; 370/250; 370/393; 370/401

(58) Field of Classification Search ................ 709/237, 709/230, 236; 370/250, 393, 907, 535
See application file for complete search history.

(56) References Cited

U.S. PATENT DOCUMENTS

| 6,122,281 | A  | * | 9/2000 | Donovan et al. ............ 370/401 |
| 6,363,078 | B1 |   | 3/2002 | Garcia et al. ............... 370/438 |
| 6,389,013 | B1 |   | 5/2002 | Doss et al. .................. 370/364 |
| 6,697,386 | B1 | * | 2/2004 | Sugawara et al. .......... 370/535 |
| 6,957,246 | B1 | * | 10/2005 | Hall et al. ................... 709/200 |
| 2001/0043603 | A1 | * | 11/2001 | Yu ............................... 370/393 |
| 2002/0138611 | A1 | * | 9/2002 | Roe et al. .................... 709/224 |
| 2002/0184385 | A1 | * | 12/2002 | Kato ............................ 709/237 |
| 2004/0066750 | A1 | * | 4/2004 | Carson et al. ............... 370/250 |
| 2004/0184489 | A1 | * | 9/2004 | Brissette et al. ............ 370/907 |

OTHER PUBLICATIONS

Karmazi, Pavel et al., "A Combined Hardware/Software ETHERNET Protocol Implementations for Embedded DSP Based Environments," 13 pages.
Kumar, Ullas, "Optical Transport Networks," IIC-China/ESC China 2002 Conference Proceedings, pp. 168-173.
Olsson, Fredrik et al., "Ethernet Over SONET/SDH; Extending Ethernet into the Metro," White Paper, Agilent Technologies, Semiconductor Products Group, 4 pages.
Optical Internetworking Forum, "System Packet Interface Level 5 (SPI-5): OC-768 System Interface for Physical and Link Layer Devices," OIF2001.134.8, SPI-5 Draft 2.0, Optical Internetworking Forum, 67 pages.
Kumar, Ullas, "Optical Transport Networks," IIC-China/ESC China 2002 Conference Proceedings, pp. 168-173, Dec. 2002.

(Continued)

*Primary Examiner*—Wen-Tai Lin
(74) *Attorney, Agent, or Firm*—Aka Chan LLP

(57) ABSTRACT

Methods and apparatus for providing tandem connection monitoring and performance monitoring capabilities in Ethernet and converged data link protocols are disclosed. According to one aspect of the present invention, a method for processing a packet which includes a preamble arrangement having at least one associated frame involves receiving a packet from a first network element included in a network path at a second network element included in the network path, and determining whether at least one error has arisen between a source of the network path and the second network element. When it is determined that an error has arisen between the source of the network path and the second network element, a first error count indication is inserted in the preamble arrangement to substantially account for the error.

30 Claims, 12 Drawing Sheets

OTHER PUBLICATIONS

Olsson, Fredrik et al., "Ethernet Over SONET/SDH; Extending Ethernet into the Metro," White Paper, Agilent Technologies, Semiconductor Products Group, 4 pages, Dec. 2001.

Optical Internetworking Forum, "System Packet Interface Level 5 (SPI-5): OC-768 System Interface for Physical and Link Layer Devices," Apr. 2001, OIF2001.134.8, SPI-5 Draft 2.0, Optical Internetworking Forum, 67 pages.

* cited by examiner

METHOD AND APPARATUS FOR PROVIDING TANDEM CONNECTION, PERFORMANCE MONITORING, AND PROTECTION ARCHITECTURES OVER ETHERNET PROTOCOLS

BACKGROUND OF THE INVENTION

1. Field of Invention

The present invention relates generally to data communication systems. More particularly, the present invention relates to systems and methods for enabling Ethernet that is transported over a SONET network to benefit from features such as tandem connection monitoring.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

The Ethernet protocol or data transport technology is widely used in local area networks (LANs). However, in larger networks such as metro area networks (MANs), SONET transmission systems are typically used. Hence, when data is transmitted from LANs onto MANs, service providers generally must manage the two different protocols, and effectively perform a translation between the two protocols. Service providers may have to configure equipment and services for transmitting data from LANs onto MANs, which may be an involved and expensive process.

Converged Data Link (CDL) is a protocol that provides Ethernet with operations, administration, and management capabilities which service providers generally expect from SONET. The use of Ethernet with CDL to move data over MANs effectively eliminates the need to conduct translation between the Ethernet protocol and the SONET protocol. Further, the need to configure equipment and services to accept both Ethernet and SONET may be substantially eliminated.

Since SONET transmission systems offers some desirable features that are not offered by Ethernet or by Ethernet with CDL, when Ethernet is used to transport data over a MAN instead of SONET, some of the desirable features may be lost. Tandem connection monitoring is one feature that is offered by SONET, as well as SDH, which is generally not available to Ethernet. The use of tandem connection monitoring generally enables transmission section error performance information to be provided across a plurality of domains or service provider networks, as will be appreciated by those skilled in the art. Hence, it is possible to determine the domain within which an error occurs.

FIG. 1 is a diagrammatic representation of a network which includes multiple domains. A network 100 may be split into domains 104. Each domain 104 includes network elements 108, e.g., a first domain 104a includes a network element 108a. When a path message 112 is to be sent from network element 108a, which is in first domain 104a, to a network element 108d in a third domain 104c, packets are sent through network elements 108b, 108c in a second domain 104b.

When tandem connection monitoring is available in network 100, an operator or network administrator may evaluate performances of a sub-network or domain 104 within network 100, as mentioned above. Tandem connection monitoring is used in SONET and SDH networks to provide information on errors that arise within a network. When data is transferred through different domains 104 in network 100, monitoring the performances associated with each path segment 116 associated with path message 112 may be important, particularly when each domain 104 may be managed by a different operator. Using tandem connection monitoring enables the sources of errors and defects to be identified, thereby enabling modifications or corrections to be made to the sources to reduce the occurrence of errors and defects.

Since tandem connection monitoring is generally not available in an Ethernet protocol or an Ethernet with CDL protocol, it is generally not possible to monitor the performance of each path between different domains that is associated with an overall full path. In other words, it is typically not possible with an Ethernet protocol to determine where particular errors or defects are generated. Since Ethernet traffic is becoming more prevalent in MANs, the ability to provide tandem connection monitoring for an Ethernet protocol would be desirable.

Therefore, what is needed is a method and an apparatus for enabling tandem connection monitoring to be applied to Ethernet packets that are sent through a network. More specifically, what is desired is a system which allows tandem connection and performance monitoring of Ethernet signals.

SUMMARY OF THE INVENTION

The present invention relates to a system and a method for providing tandem connection monitoring and performance monitoring capabilities in Ethernet and converged data link (CDL) protocols. According to one aspect of the present invention, a method for processing a packet which includes a preamble arrangement having at least one associated frame involves receiving a packet from a first network element included in a network path at a second network element included in the network path, and determining whether at least one error has arisen between a source of the network path and the second network element. When it is determined that an error has arisen between the source of the network path and the second network element, a first error count indication is inserted in the preamble arrangement to substantially account for the error.

In one embodiment, the method also includes monitoring a bit interleaved parity associated with a previous packet using the second network element, wherein the bit-interleaved parity is stored in the preamble arrangement. In another embodiment, if the second network element is a source of a tandem connection within the network path, the also includes inserting a second error count indication in the preamble arrangement which substantially accounts for the error and inserting at least one of a tandem connection remote error indication and a tandem connection remote defect indication in the preamble arrangement.

Tandem connection monitoring and performance monitoring capabilities may be provided for Ethernet traffic by storing information in the preambles of Ethernet frames that is used for tandem connection monitoring and performance monitoring. Since bits in the preambles of Ethernet frames are often unused, overwriting the bits generally does not have a significant adverse effect on the frames. Hence, tandem connection monitoring and performance monitoring may be provided in Ethernet such that data may be moved across metro area networks (MANs) using Ethernet. As a result, features that are typically SONET features may be provided in Ethernet.

According to another aspect of the present invention, a network element that is suitable for use in path within a network includes a receiver that receives an Ethernet packet having a preamble arrangement, and a processor that accesses and updates the preamble arrangement. The preamble arrangement includes at least one preamble associated with a frame included in the Ethernet packet, and contains a bit interleaved parity code, at least one of a remote error indication and a remote defect indication, a trail trace identifier, an error count, and performance monitoring information. In one embodiment, the Ethernet packet is of a converged data link (CDL) protocol. In such an embodiment, the preamble arrangement further includes operation, administration, and management information that is used in SONET networks.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Ethernet signals are often sent over metro area networks (MANs) that are configured for SONET or SDH. However, some features of SONET and SDH networks are generally not available in an Ethernet network. In particular, tandem connection monitoring is generally not available in an Ethernet protocol. Hence, Ethernet traffic that is sent on a MAN that typically uses SONET or SDH transmission systems is generally unable to benefit from tandem connection monitoring of each path or link between different domains that is associated with an overall full path through the network.

Tandem connection monitoring and performance monitoring may be provided for Ethernet signals, e.g., Ethernet signals with converged data link (CDL), by storing relevant information in the preambles of frames that are a part of an Ethernet packet. Storing such information in the preambles by overwriting bits in the preambles allows Ethernet traffic or Ethernet with CDL traffic to benefit from tandem connection monitoring and performance monitoring without impacting the payloads of the Ethernet traffic or the Ethernet with CDL traffic. In general, some types of information used for enabling tandem connection monitoring and performance monitoring may be stored in a substantially single preamble to provide tandem connection monitoring, while other information may stored using multiple preambles in an Ethernet packet.

Figure 1:
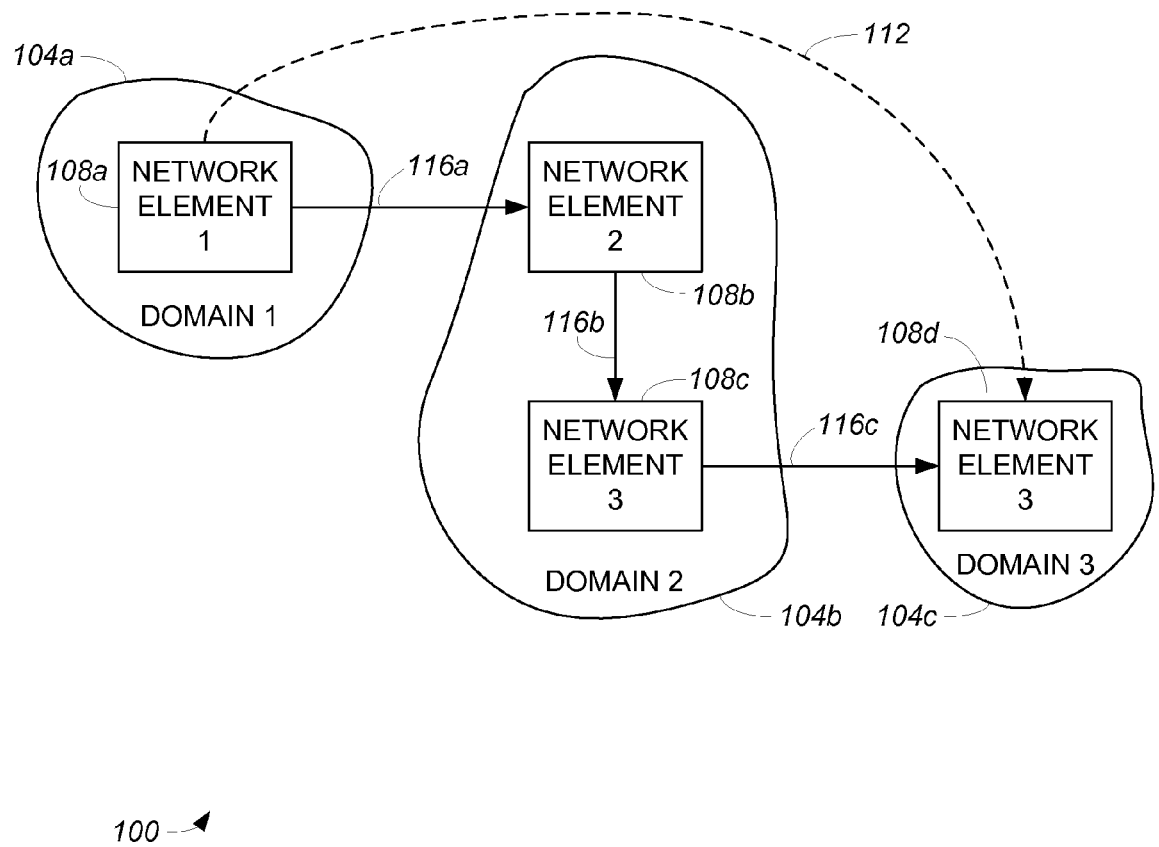
FIG. 1 is a diagrammatic representation of network which includes a plurality of domains.
Figure 2:
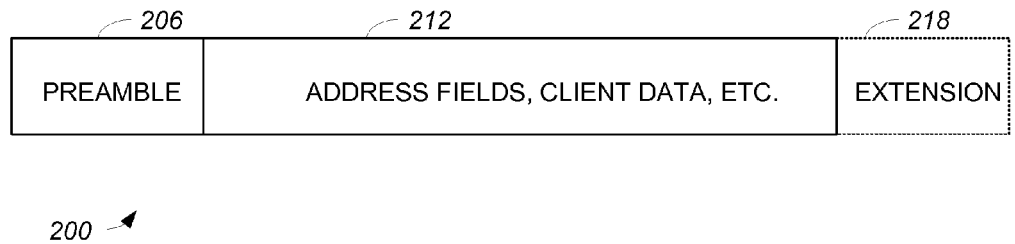
FIG. 2 is a diagrammatic representation of an Ethernet frame.

FIG. 2 is a diagrammatic representation of an Ethernet frame. An Ethernet frame 200 includes a preamble 206 and a 'body' 212. Ethernet frame 200 may also include an optional extension 218. Preamble 206, which may include approximately eight bytes or sixty-four bits, conventionally were used to provide the capability for asynchronous signals with a lower number of fragments to be aligned. That is, preamble 206 has historically been used for synchronization purposes. However, as discussed above, a higher number of fragments are generally being used, and data is often sent continuously, the use of preamble bits for synchronization purposes is becoming less important. Hence, it may be possible to use preamble bits for other purposes, e.g., to allow for tandem connection monitoring.

Body 212 generally includes address fields, fields which store client data, fields which store a length of a data field, and a field which stores a frame check sequence. By way of example, body 212 may include, but is not limited to including, media access control (MAC) addresses and MAC client data in the form of bits that are to be transferred from a source to a destination or a sink. Typically, MAC addresses may include up to approximately six bytes each, and client data may contain up to approximately 1500 bytes.

In order to effectively ensure that Ethernet frame 200 may be long enough for collisions to propagate properly, Ethernet frame 200 may include an extension field 218. Extension field 218 may be used to allow Ethernet frame 200 to meet a minimum transmission length requirement, as will be appreciated by those skilled in the art.

Figure 3A:
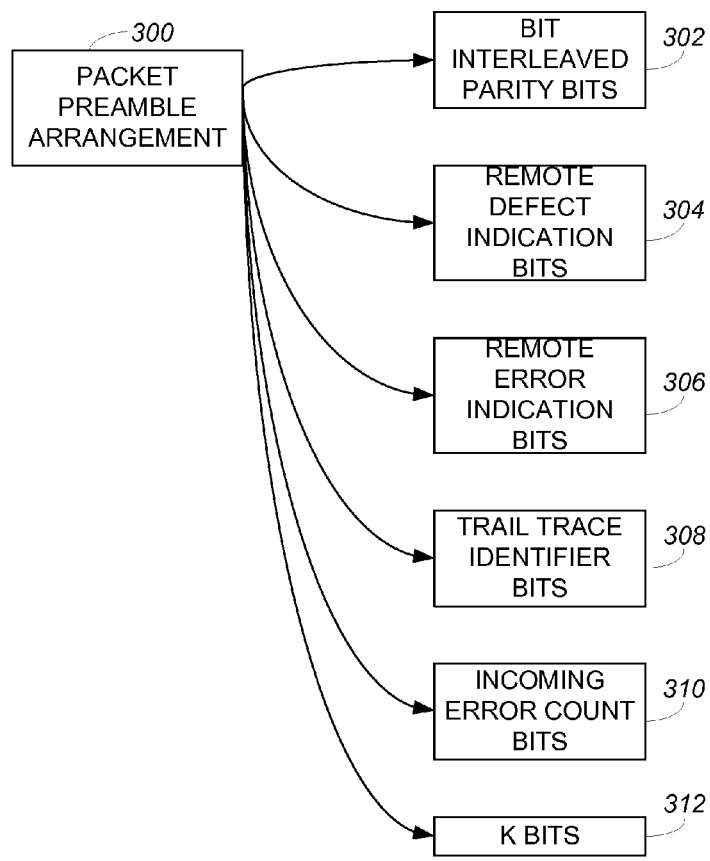
FIG. 3a is a block diagram representation of contents included in the preambles of an Ethernet packet in accordance with an embodiment of the present invention.

Preamble 206, in the described embodiment, may be used to store information which allows tandem connection monitoring to be performed when a sequence of Ethernet frames is sent over an overall path which includes a tandem connection path. More than one preamble 206 may be needed to store certain types of information. With reference to FIG. 3a, the contents of preambles associated with an Ethernet packet will be described in accordance with an embodiment of the present invention. Each preamble of an Ethernet frame generally includes eight bytes, or sixty-four bits, as previously mentioned. A packet preamble arrangement 300, which may include any number of preambles associated with an Ethernet packet, is arranged to support tandem connection monitoring, performance monitoring, and protection architectures. In one embodiment, when a CDL protocol is supported, packet preamble arrangement 300 may also include operation, administration, and maintenance (OAM) capabilities which are typically expected within SONET networks.

Packet preamble arrangement 300 includes bit-interleaved parity bits 302. Bit interleaved parity bits 302 may generally represent a bit interleaved parity over four bits. In one embodiment, a diagonal interleaved parity over four bits (DIP-4) may be calculated over a previous packet, without including overhead bits associated with the previous packet, and stored as bit interleaved parity bits 302. DIP-4 generally offers substantially the same error protection capabilities as other BIP-4 codes, in the presence of random errors. Additionally, DIP-4 allows single-column errors, as they may occur in a single defective line, to be spread across multiple parity bits, as will be appreciated by those skilled in the art. As such, DIP-4 codes effectively reduce the probability of undetected errors occurring by several orders of magnitude when compared with the probability of undetected errors occurring when no error detection is implemented.

While DIP-4 codes may be calculated based on eight bits, the number of bits used to calculate DIP-4 codes may vary widely, e.g., the calculation may be based on sixteen bits. To calculate DIP-4 codes, a stream of data words may be received and aligned in columns of bits such that the first word in the stream is at the top of the columns and the last word in the stream is at the bottom of the columns. Parity bits may be generated by summing the data diagonally. In one embodiment, a final sixteen bit checksum generated during the DIP-4 process is split into two bytes, which are added to each other modulo-2 to produce an eight bit check sum that is divided into two four bit nibbles that are added to each other modulo-2 to produce a final DIP-4 code. The final DIP-4 code may be stored as bit interleaved parity bits 302 in preamble 300. A method of calculating DIP codes is described in OIF2001.134, entitled "System Packet Interface Level 5 (SPI-5): OC-768 System Interface for Physical and Link Layer Devices," dated April 2001, which is incorporated herein by reference in its entirety.

Preamble arrangement 300 also includes remote defect indication (RDI) bits 304 and remote error indication (REI) bits 306. RDI bits 304 may include bits which indicate RDI far end receive failures between two adjacent network elements within a full path, bits which indicate RDI from an overall source of a payload to the overall destination or sink of the payload, and bits which indicate RDI within a tandem connection that is a part of the full path. Similarly, REI bits 306 may include bits which indicate REI far end receive failures between two adjacent network elements within a full path, bits which indicate REI from an overall source of a payload to the overall sink of the payload, and bits which indicate REI within a tandem connection that is a part of the full path. RDI and REI process will be discussed below with reference to FIGS. 7a and 7b.

Trail trace identifier (TTI) bits 308 in preamble arrangement 300, which may be based on sixteen bytes and inserted by the source of a payload, is a general purpose TTI. A general purpose TTI may be expressed in bits associated with approximately seventy-six frames such that TTI bits 308 of the first eight frames of the seventy-six frame sequence may be sued to store a multiframe alignment word, while the remaining frames in the sequence may be used to transport information associated with a tandem connection. In general, TTI bits 308 may be used to allow the signal integrity of a particular layer to be checked. A TTI mechanism generally ensures that a network element is sending data to an expected network element, i.e., that the network is properly configured.

Incoming error count (IEC) bits 310 in preamble arrangement 300 are arranged to indicate errors detected by network elements in a full path. IEC bits 310 may include bits that indicate errors detected by each network element in the full path, and bits that indicate errors detected substantially only inside a tandem connection. Finally, preamble arrangement 300 may include 'K' bits 312 which may be used for protection management. As will be appreciated by those skilled in the art, 'K' bits may be spread out over multiple frames, i.e., multiple preambles of multiple frames, to form K1, K2, or K3 bytes. By way of example, the eight bits of a K1 byte may be spread out in preambles of eight frames. In one embodiment, 'K' bits 312 may include twenty-four bits which are used in a transport protection management protocol. The twenty-four bits may include bits which identify a source node, a destination node, and commands such as a bridge request code. 'K' bytes are described in the ITU-T G.841 standard entitled "Types and Characteristics of SDH Network Protection Architectures," which is incorporated herein by reference in its entirety. Using 'K' bits 312 stored in preamble arrangement 300 allows performance monitoring to be performed using substantially any suitable method.

Figure 3B:
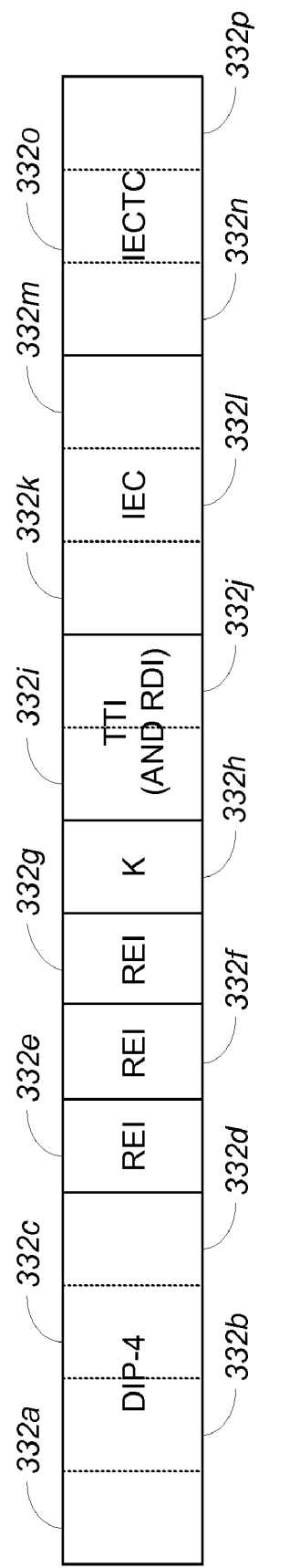
FIG. 3b is a diagrammatic representation of bits included in a portion of a preamble of an Ethernet frame in accordance with an embodiment of the present invention.

The bits stored in preamble arrangement 300 may be arranged in substantially any suitable order, and may generally be positioned anywhere within each preamble of preamble arrangement 300. FIG. 3b is a diagrammatic representation of bits included in a preamble of an Ethernet frame in accordance with an embodiment of the present invention. A portion 330 of a preamble of an Ethernet frame includes sixteen bits 332, with a first bit 332a being a most significant bit within portion 330 and a sixteenth bit 332p being a least significant bit within portion 330. It should be appreciated that although portion 330 is described as having sixteen bits 332, the number of preamble bits included in portion 330 may vary widely depending upon the requirements of a particular system.

Bit interleaved parity code bits, e.g., DIP-4 code bits, may be stored as four bits 332-d within portion 330. An REI far end receive failure bit is stored as bit 332e, while a full path REI bit is stored as bit 332f. A tandem connection REI (TC-REI) bit is stored as bit 332g, and a 'K' bit is stored as bit 332h. It should be appreciated that with respect to REI, RDI, and 'K' bits, since more than one bit is often needed to express an REI, an RDI, and a protection management scheme that uses a 'K' byte, a sequence of bits associated with an REI, and RDI, or a 'K' byte may be spread out over the preambles of multiple frames.

Bits 332i, 332j are arranged to store bits associated with a TTI, as well as RDI information, which may include RDI far end receive failure information, full path RDI information, and tandem connection RDI (TC-RDI) information. That is, bits 332i, 332j may also be used to transport RDI information between adjacent network elements, full path RDI information, and TC RDI information, as for example in the preamble of every eight frame of an overall TTI. Bits 332k–m are arranged to store IEC bits, and may be updated by each network element which detects errors, and bits 332n–p are arranged to store IEC-TC bits, and may substantially only be written by a network element that is associated with the start of a tandem connection path. As will be understood by those skilled in the art, the sequence of bits stored as bits 332k–m and bits 322n–p may vary widely. By way of example, bit sequence of '000' stored as bits 332k–m may indicate that there are no detected errors or DIP-4 violations, and a bit sequence of '001' may indicate that there is one detected error or DIP-4 violation, while a bit sequence of '111' may serve as an incoming alarm indication signal.

Figure 4:
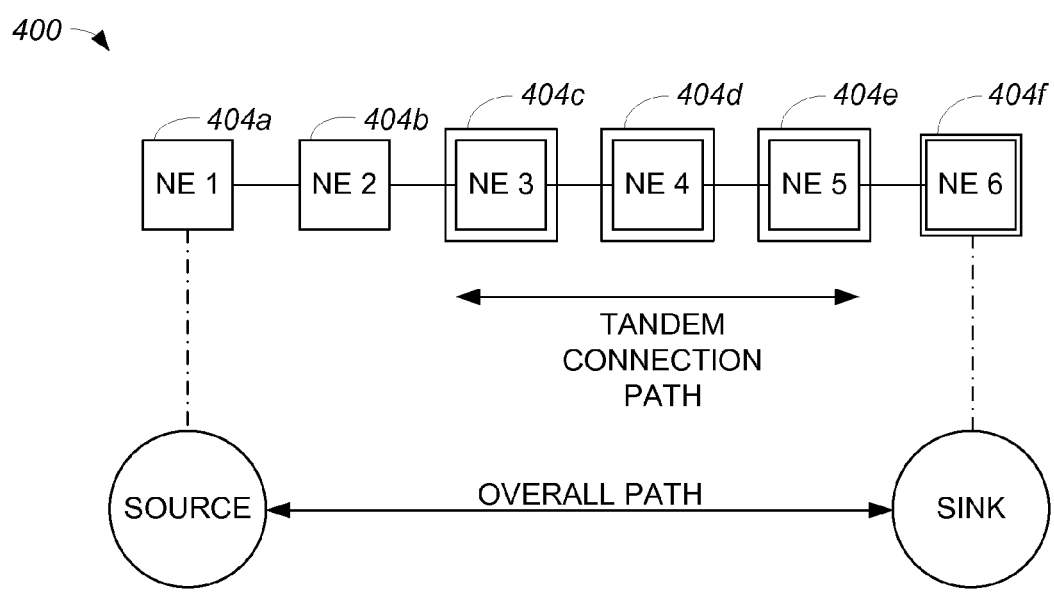
FIG. 4 is a diagrammatic representation of an overall path which includes a tandem connection path in accordance with an embodiment of the present invention.

Preamble 330 maybe written to as preamble 330 or, more specifically, the Ethernet frame which includes preamble 330, is sent from a source of an overall path to a sink of the overall path. FIG. 4 is a diagrammatic representation of an overall path which includes a tandem connection path in accordance with an embodiment of the present invention. An overall path 400 begins at a first network element 404a, which is a source of path 400. In general, network elements 404 are nodes, e.g., routers, within a network. From first network element 404a, a frame that is being propagated from first network element 404a to sixth network element 404f, which is a sink, passes through a second network element 404b as well as a tandem connection path which originates at a third network element 404c and ends at a fifth network element 404e.

Typically, a calculation of a bit interleaved parity occurs at first network element 404a, or the source of overall path 400. It should be appreciated that the bit-interleaved parity is calculated over the previous packet which originated at first network element 404a, and is inserted in the preamble of a frame of a current packet that originates at first network element 404a. Incoming error counts may generally be determined by network elements 404a–f, and inserted into the preamble of the frame as the frame passes through network elements 404a–f. Additional error counts may be inserted by third network element 404c, which is the source of a tandem connection path, as will be discussed below.

Figure 5A:
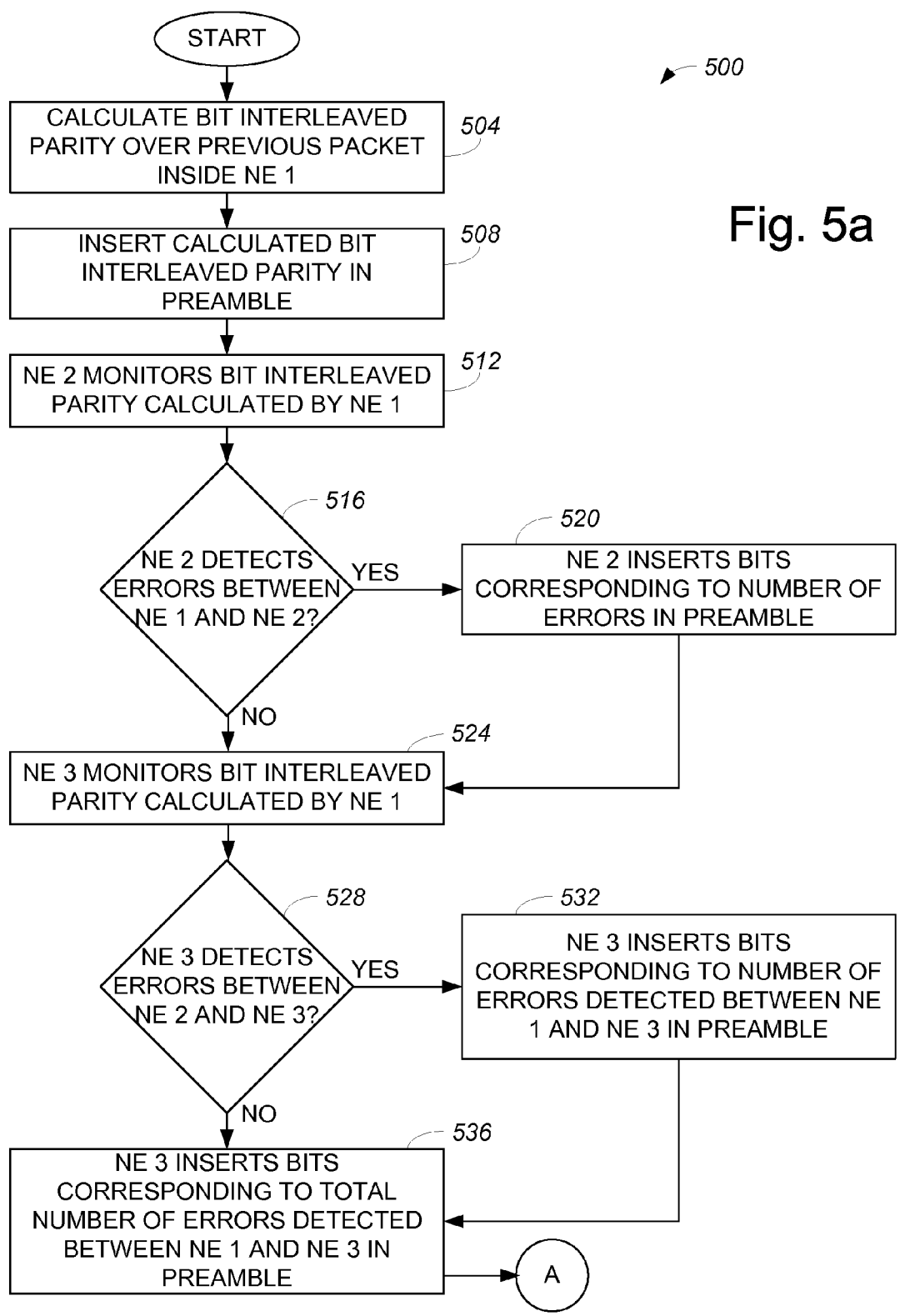
FIGS. 5a and 5b are a process flow diagram which illustrates one method of using the preamble associated with an Ethernet frame of a packet as the frame passes along a path, i.e., path 400 of FIG. 4, to facilitate tandem connection monitoring in accordance with an embodiment of the present invention.
Figure 5B:
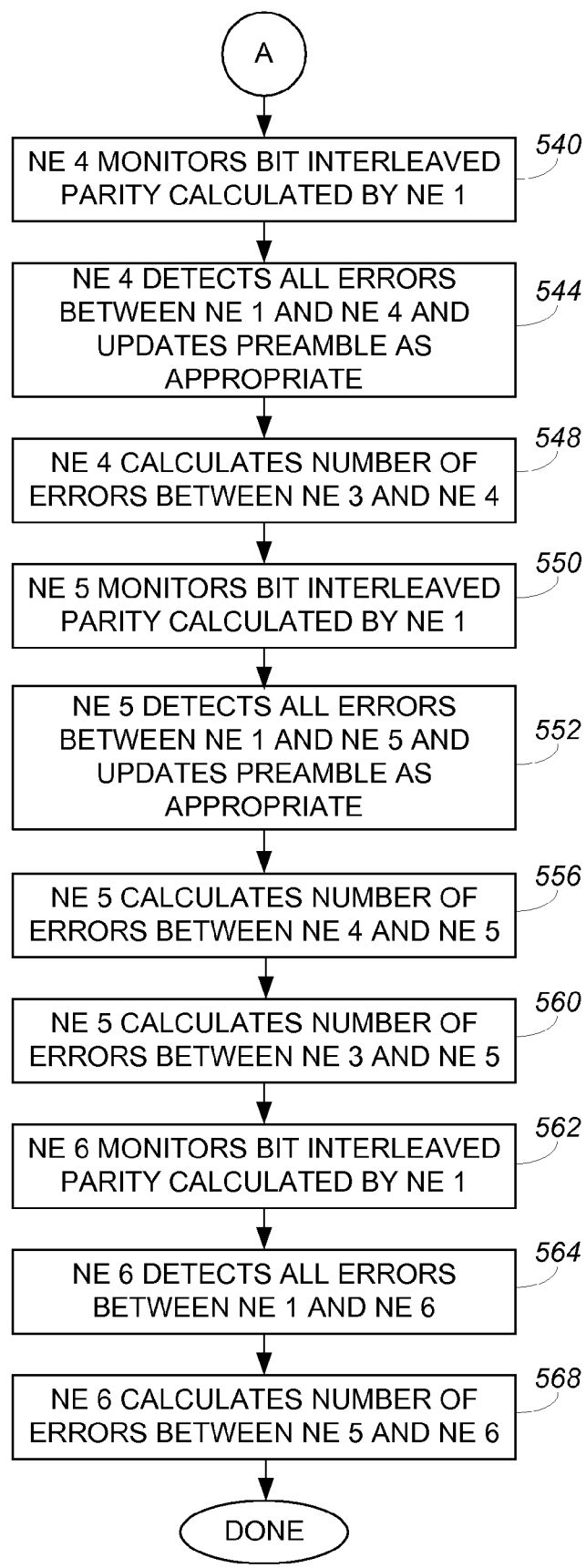
Figure 6A:
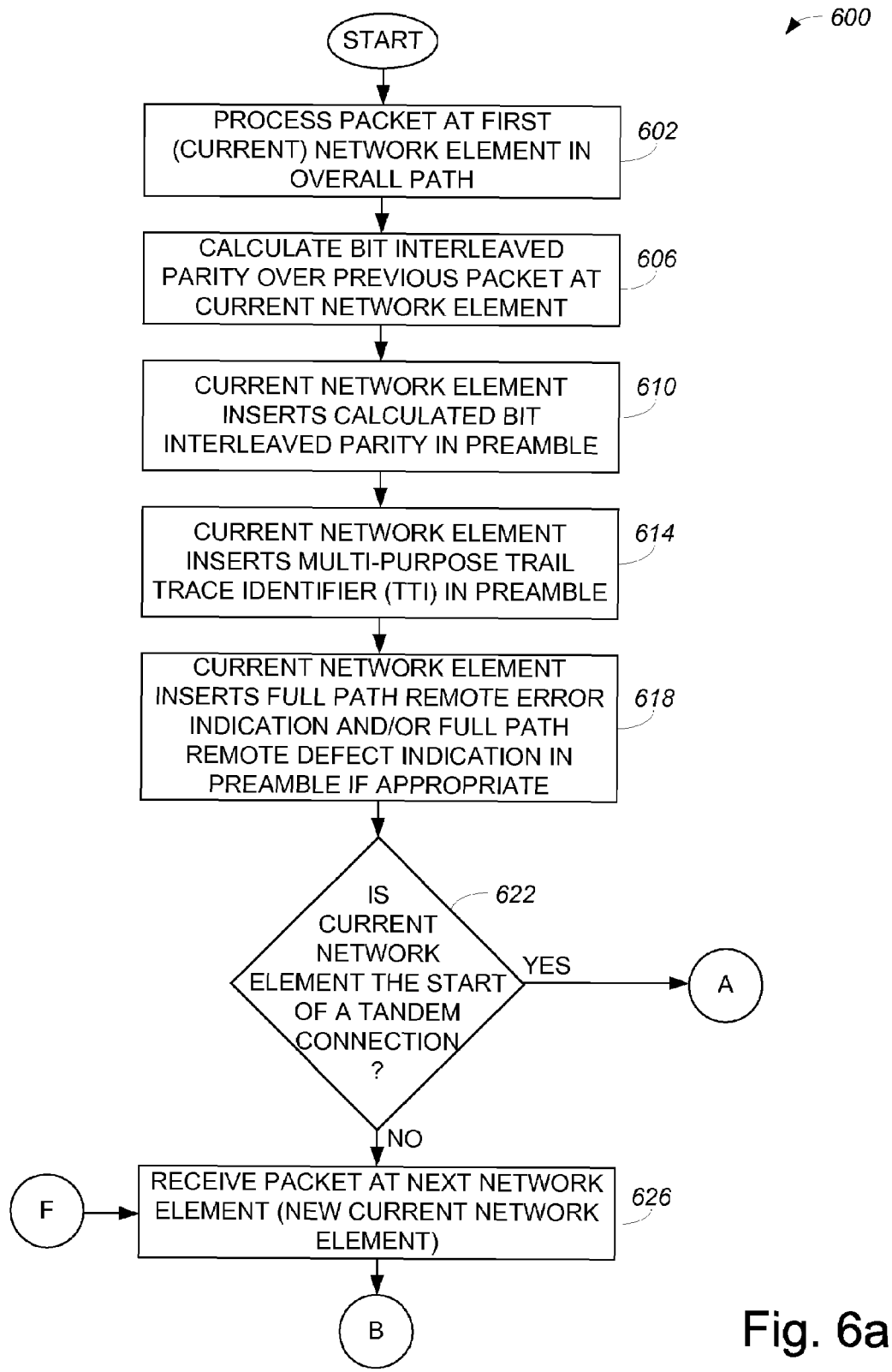
FIGS. 6a–d are a process flow diagram which illustrates the steps associated with one method of updating the preambles of frames of an Ethernet packet as the Ethernet packet passes through a path will be described in accordance with an embodiment of the present invention.
Figure 6B:
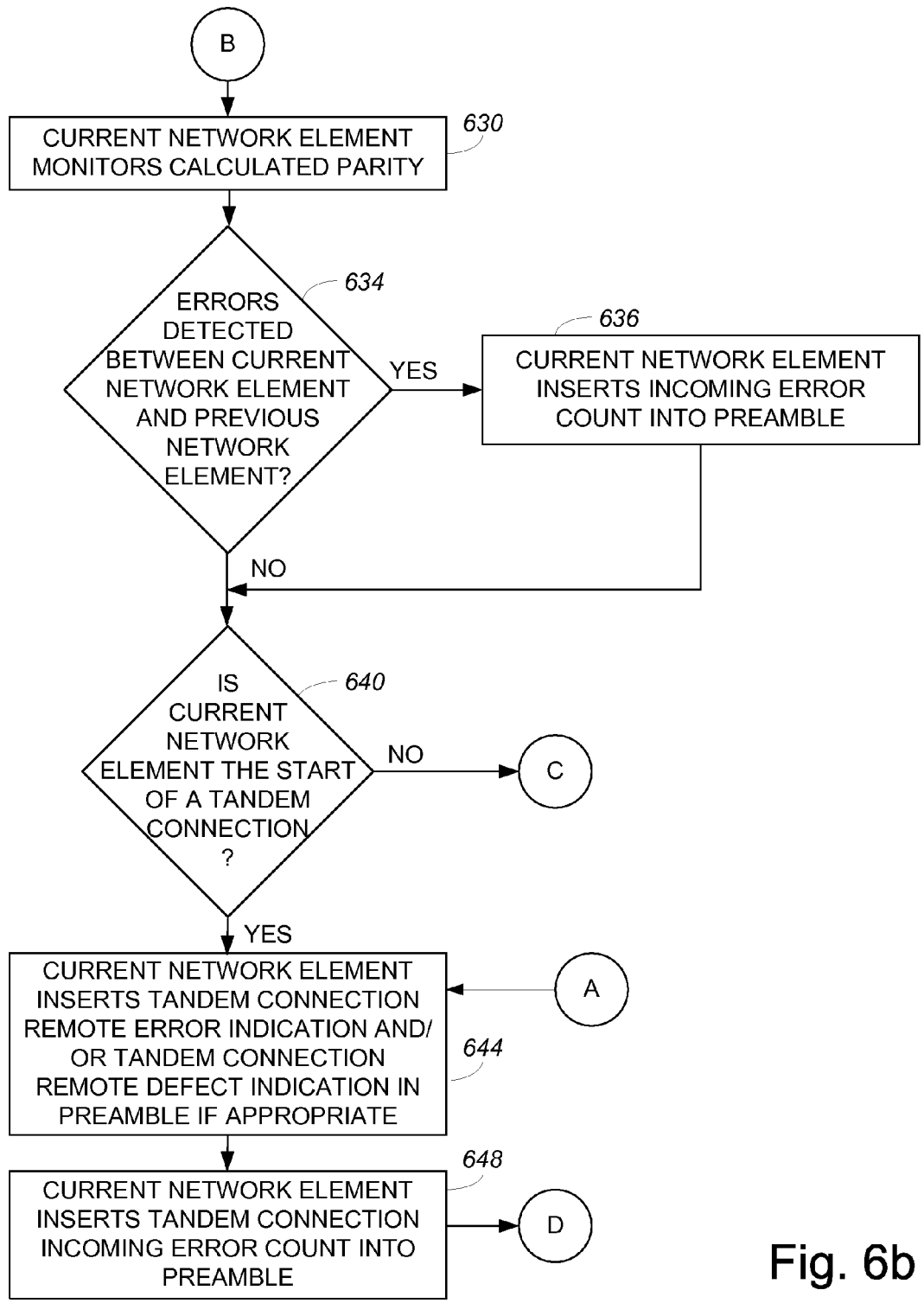
Figure 6C:
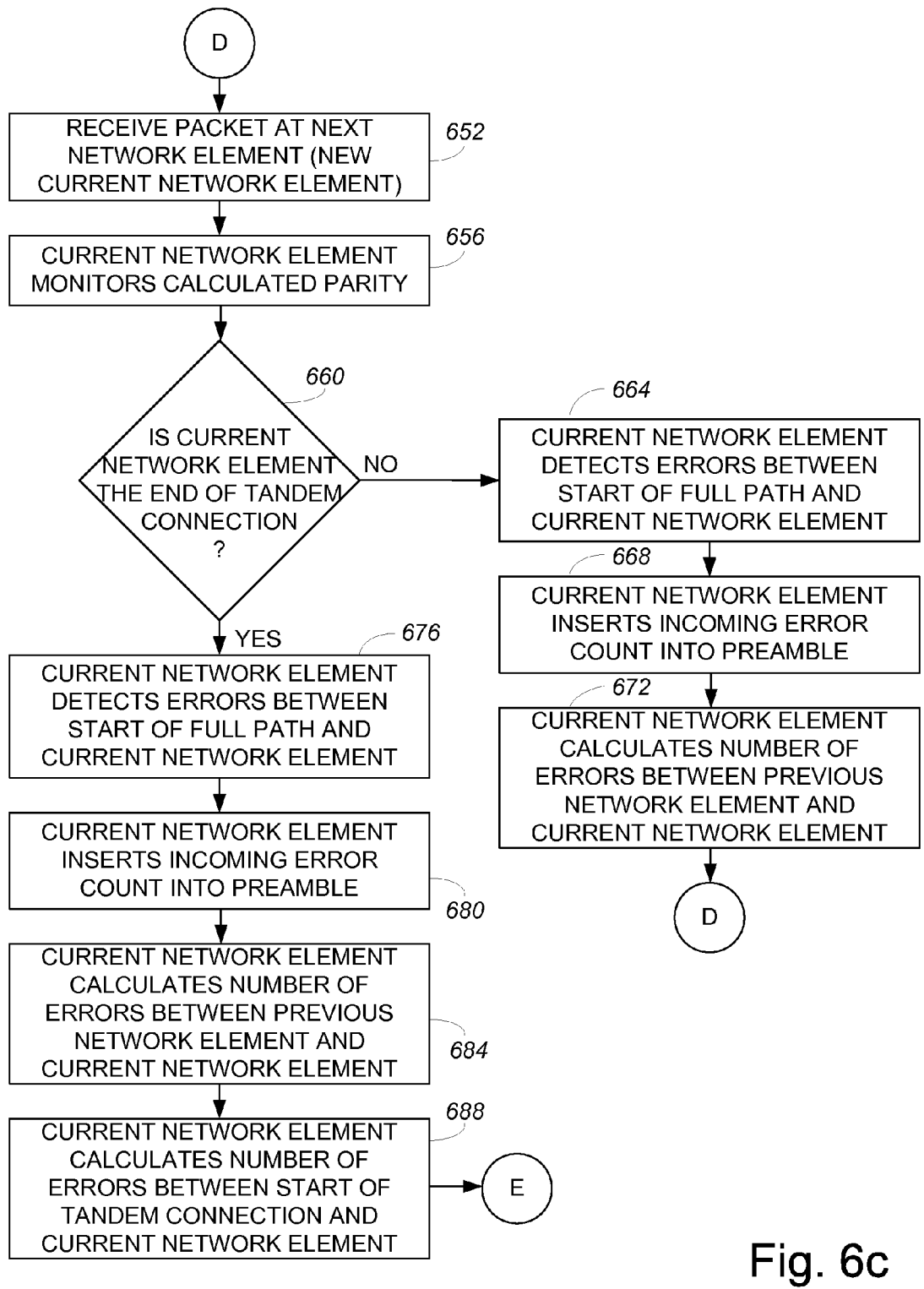
Figure 6D:
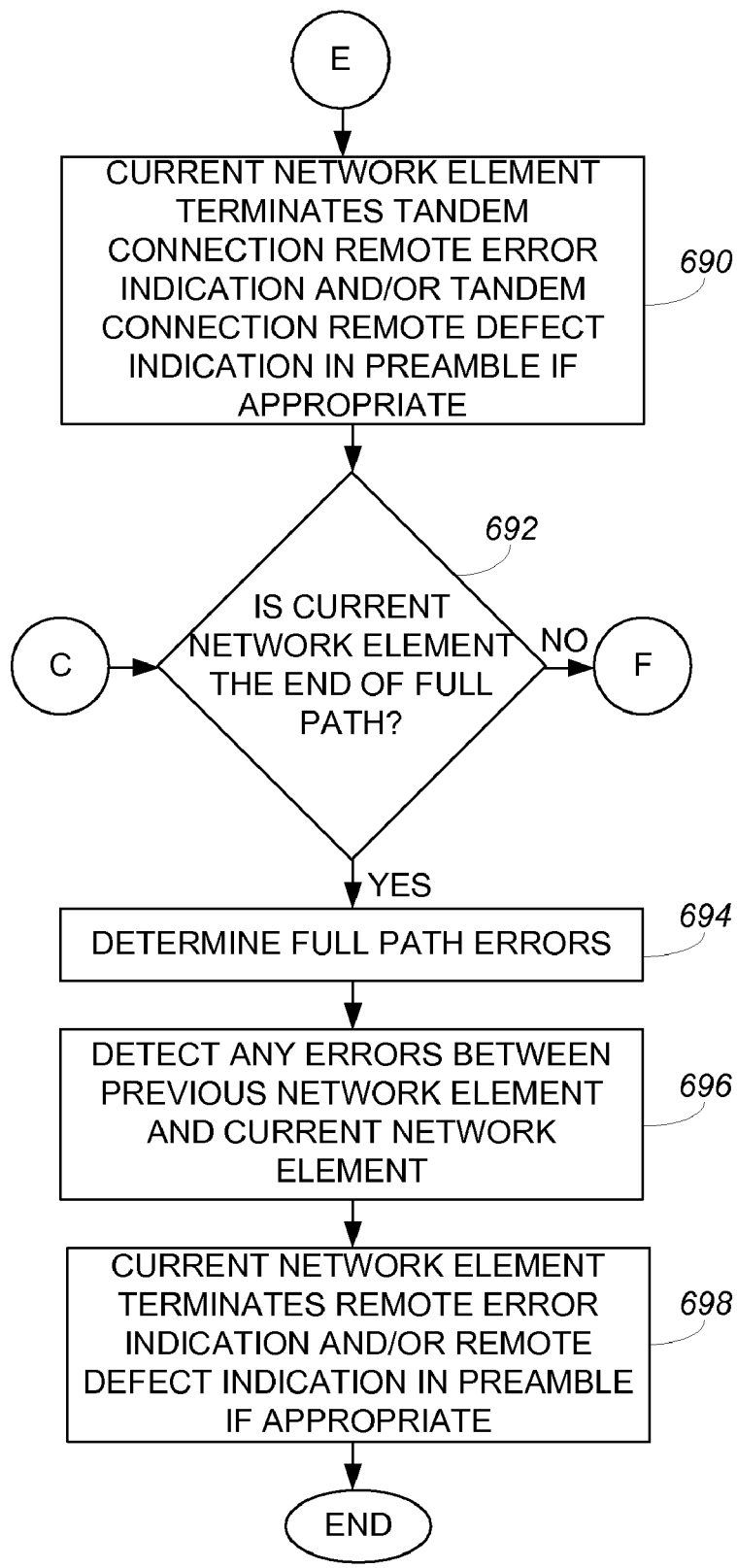

With reference to FIGS. 5a and 5b, one specific method of using preambles associated with an Ethernet frame of a packet as the frame passes along a path, i.e., path 400 of FIG. 4, to facilitate tandem connection monitoring will be described in accordance with an embodiment of the present invention. A process 500 of using a preamble to facilitate tandem connection monitoring begins in step 504 when, as a current packet is processed by a first network element (NE 1) of a full path, e.g., network element 404a of path 400 of FIG. 4, the bit interleaved parity over a previous packet is calculated by the first network element. As discussed above, the bit-interleaved parity may be substantially any bit-interleaved parity, as for example a bit interleaved parity based on four bits such as DIP-4. Typically, the bit-interleaved parity is calculated using payload bits of the previous packet, and does use overhead bits such as preamble bits. As a result, any bits stored as overhead bits will generally not affect the bit interleaved parity calculation.

Once the bit interleaved parity is calculated, bits representing the bit-interleaved parity are inserted as preamble bits in the current packet in step 508. Then, in step 512, as the packet passes to a second network element (NE 2) that, like the first network element, is part of a first domain, the second network element monitors the bit interleaved parity that is stored in the preamble. The second network element, e.g., network element 404b of FIG. 4, is used to determine if there are any errors detected between the first network element and the second network element in step 516. When the second network element detects errors between the first network element and the second network element, the second network element inserts bits in the preamble that correspond to the number of detected errors in step 520. Typically, the number of errors is inserted as four bits in the IEC field of the preamble.

After the second network element inserts bits in the IEC field of the preamble in step 520, or if the second network element does not detect any errors between the first network element and the second network element in step 516, process flow moves to step 524 in which the packet is passed to a third network element (NE 3) which monitors the bit interleaved parity that was calculated by the first network element. In the described embodiment, the third network element, as for example third network element 404c of FIG. 4, is part of a second domain in which tandem connection monitoring occurs.

In step 528, the third network element determines if it has detected any errors between the second network element and the third network element. While the third network element can detect substantially all detectable errors between the first network element and the third network element, the third network element may determine a number of errors between the second network element and the third network element using information stored in the IEC field of the preamble. Hence, when the third network element detects errors between the second network element and the third network element, in step 532, the third network element reports or inserts bits corresponding to the number of errors between the first network element and the third network element in the IEC field of the preamble. That is, the third network element may overwrite any bits stored in the IEC field when errors are detected between the second network element and the third network element.

Once bits corresponding to the number of errors detected by the third network element between the first network element and the third network element are stored in the preamble, or if it is determined in step 528 that the third network element did not detect any errors between the second network element and the third network element, the third network element inserts bits which correspond to the total number of errors detected between the first network element and the third network element within the preamble in step 536. It should be appreciated that the bits inserted in step 536 are inserted in a different location than the bits which may have been inserted in step 532. Since the third network element is the starting point of a tandem connection, the third network element reports or stores the total number of detected errors between the first network element and the third network element in the IEC TC field of the preamble in step 536, whereas the bits which were reported or stored in step 532 were stored in the IEC field. As previously mentioned, typically only a starting point of a tandem connection may write to the IEC TC field in the preamble.

After the IEC TC field in the preamble has been written into, the packet is passed to a fourth network element (NE 4) which is also part of the tandem connection, and the fourth network element monitors the bit interleaved parity calculated by the first network element in step 540. The fourth network element also detects substantially all errors between the first network element and the fourth network element in step 544 and updates the IEC field in the preamble, if appropriate, and may determine a number of errors which were detected between the third network element and the fourth network element in step 548.

When the number of errors between the third network element and the fourth network element have been ascertained, the packet is passed to a fifth network element (NE 5), which is the last network element in the tandem connection. The fifth network element monitors the bit-interleaved parity calculated by the first network element in step 552. Upon monitoring the bit-interleaved parity, the fifth network element detects substantially all errors between the first network element and the fifth network element in step 552, and updates the preamble as appropriate. Then, the fifth network element may calculate the number of errors which occurred between the fourth network element and the fifth network element in step 556. In the described embodiment, since the fifth network element is at the terminus of the tandem connection, the fifth network element also determines the number of errors between the third network element and the fifth network element in step 556. Such a determination may be made, for example, by comparing the total number of errors detected by the fifth network element with information that is stored in the IEC TC field of the preamble, which indicates the number of total errors detected by the third network element or, more generally, the network element that is the starting point of the tandem connection.

Once errors are detected by the fifth network element, the packet is passed to a sixth network element (NE 6) which is the last network element included in a full path which originated at the first network element, as shown in FIG. 4. The sixth network element monitors the bit-interleaved parity calculated by the first network element in step 562, and detects substantially all errors associated with the full path in step 564. That is, the sixth network element detects substantially all errors between the first network element and the sixth network element. After substantially all errors have been detected, the sixth network element calculates the number of errors between the fifth network element and the sixth network element in step 568, and the process of using a preamble to facilitate tandem connection monitoring is completed.

FIGS. 6a–d are a process flow diagram which illustrates the steps associated with one method of updating the preambles of frames of an Ethernet packet as the Ethernet packet passes through a path will be described in accordance with an embodiment of the present invention. A process 600 of updating preambles begins at step 602 in which a packet is processed at a first, or current, network element in an overall path. That is, the packet is processed at a source of the overall path. In step 606, the current network element calculates the bit-interleaved parity over the previous packet. After the bit-interleaved parity is calculated, the current network element inserts the calculated bit interleaved parity into a preamble associated with the packet in step 610. Herein and after, the term "preamble" is used to refer to substantially any number of preambles in a packet, or a preamble arrangement. In other words, inserting bits into a "preamble" may involve inserting bits into a plurality of preambles, if appropriate.

Once bits which correspond to the bit interleaved parity of the previous packet are inserted into the preamble, the current network element inserts a general purpose TTI bit into the preamble in step 614. In one embodiment, a TTI may be structured over approximately seventy-six frames, although it should be appreciated that the number of frames and, hence, preambles over which a TTI may be structure may vary widely. The current network element may also insert a full path remote error indication as well as, or in lieu of, a full path remote defect indication in the preamble as appropriate in step 618. As discussed above, the preambles of multiple frames may each have a bit inserted therein with respect to a full path remote error indication or a full path remote defect indication. Alternatively, the bits may be structured such that one preamble may be used to express a full path remote error indication, while a subsequent preamble may be used to express a full path remote defect indication. In other words, the manner in which multiple preambles may be used to express a remote error indication or a remote defect indication may vary.

In step 622, it is determined if the current network element is the start of a tandem connection. If the determination in step 622 is that the current network element is not the start of a tandem connection, then process flow moves from step 622 to step 626 in which the packet is forwarded to the next network element in the overall path. It should be appreciated that once the next network element receives the packet, the next network element effectively becomes the current network element. The new current network element monitors the calculated parity, i.e., the bit interleaved parity stored in the preamble, in step 630, and determined in step 634 whether any errors have been detected between the current network element and the previous network element.

When it is determined in step 634 that errors have been detected between the current network element and the previous network element, the current network element inserts bits corresponding to the number of detected errors into the preamble in step 636. Such bits, which generally correspond to a total number of errors detected by the current network element, are inserted into the IEC field of the preamble in the described embodiment.

After incoming error count bits are inserted into the preamble in step 636, or if it is determined in step 634 that no errors have been detected between the current network element and the previous network element, process flow moves to step 640 in which it is determined if the current network element in the start of a tandem connection. If it is determined that the current network element is the start of a tandem connection, then the current network element inserts either or both a tandem connection remote error indication and a tandem connection remote defect indication in the preamble as appropriate in step 644. Then, the current network element inserts a tandem connection incoming error count into the preamble, e.g., into the IEC-TC field in the preamble, in step 648.

Once the tandem connection incoming error count is inserted into the preamble, the packet is sent to the next network element which receives the packet in step 652. When the next network element receives the packet, the next network element effectively becomes the current network element, and monitors the parity stored in the preamble in step 656. A determination is then made in step 660 as to whether the current network element is the end of the tandem connection.

When the determination in step 660 is that the current network element is the end of the tandem connection, process flow moves to step 676 in which the current network element detects errors between the start of the full path and the current network element. The current network element then inserts an incoming error count into the preamble in step 684 which is essentially the total number of errors detected within the overall path up to the current network element. Once the incoming error count is inserted into the preamble, the current network element calculates the number of errors between the previous network element and the current network element in step 684. The current network element also calculates the number of errors between the start of the tandem connection and the current network element in step 688.

Upon calculating the number of errors between the start of the tandem connection and the current network element, the current network element proceeds to terminate either or both the tandem connection remote error indication and the tandem connection remote defect indication in the preamble, as appropriate, in step 690. It is then determined in step 692 whether the current network element is the end of the full path. That is, it is determined in step 692 if the current network element is the sink of the full path.

If the determination in step 692 is that the current network element is not the end of the full path, process flow returns to step 626 in which the packet is received at the next network element in the full path. Alternatively, if it is determined in step 692 that the current network element is the end of the full path, then full path errors are determined in step 694. Determining full path errors generally includes identifying substantially all errors detected by the current network element, i.e., identifying errors detected between the source of the full path and the sink of the full path. After full path errors are determined, any errors between the previous network element and the current network element may be detected in step 696, as for example by comparing the number of detected full path errors with the bits stored in the IEC field of the preamble. Once the errors between the previous network element and the current network element are detected, the current network element terminates either or both the remote error indication and the remote defect indication in the preamble in step 698, as appropriate, and the process of updating a preamble as a packet passes along a full path is completed.

Referring back to step 660 in which it is determined if the current network element is the end of a tandem connection, if it is determined that the current network element is not at the end of a tandem connection, then the current network element is a part of the tandem connection. As such, in step 664, the current network element detects errors between the start of the full path and the current network element. Once the errors between the start of the full path and the current network element are detected, the current network element inserts an incoming error count into the preamble in step 668. It should be appreciated that the incoming error count is, in the described embodiment, indicative of a total number of errors detected within the full path up to the current network element.

After the current network element inserts the incoming error count into the preamble, the current network element calculates the number of errors between the previous network element and the current network element in step 672. Then, process flow returns to step 652 in which the packet is received at the next network element.

Returning to step 640 and the determination of whether the current network element is at the start of a tandem connection, if it is determined that the current network element is not at the start of a tandem connection, the indication is that the current network element may be the sink of the full path. Accordingly, process flow moves from step 640 to step 692 in which it is determined if the current network element is at the end of the full path.

With reference back to step 622, if it is determined that the current network element is the start of a tandem connection, then the implication is that the current network element may write either or both a remote error indication or a remote defect indication into the preamble. Hence, process flow proceeds from step 622 to step 644 in which the current network element may insert at least one of a tandem connection remote error indication and a tandem connection remote defect indication into the preamble, if appropriate.

Figure 7:
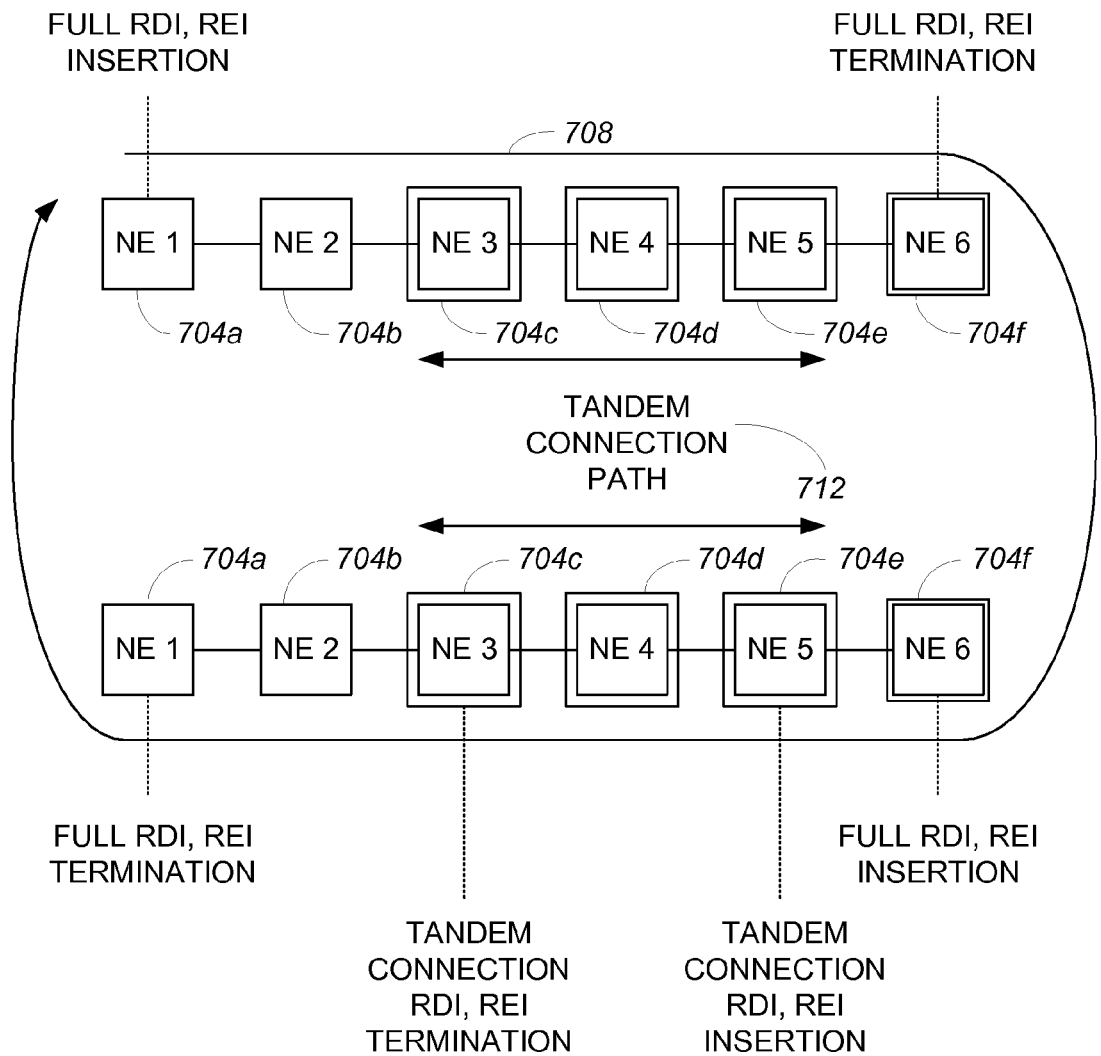
FIG. 7 is a diagrammatic representation of a full path in which remote error indications and remote defect indications are inserted and extracted in accordance with an embodiment of the present invention.

As previously mentioned, a remote error indication and a remote defect indication may be inserted into a preamble and extracted or terminated from the preambles of multiple frames. In one embodiment, a remote error indication for a full path (full REI) or a remote defect indication for a full path (full RDI) may be inserted by a source of a full path, while a tandem connection remote error indication (TC REI) and a tandem connection remote defect indication (TC RDI) may be inserted by a source of a tandem connection. The full REI and the full RDI may be extracted or terminated by a sink of the full path, while the TC REI and the TC RDI may be extracted or terminated by a sink of the tandem connection. With reference to FIG. 7, the insertion and termination of a full REI, a full RDI, a TC REI, and a TC RDI will be described in accordance with an embodiment of the present invention. Network elements 704 are included in an overall full path 708. Overall full path 708 includes a first full path which originates at network element 704*a* and terminates at network element 704*f*, and a second full path which effectively originates at network element 704*f* and terminates at network element 704*a*.

When network element 704*a* is a source of a full path, a full REI and a full RDI may be inserted into preambles associated with multiple frames of an Ethernet packet by network element 704*a*. Network element 704*f*, which may be a sink of the full path when network element 704*a* is the source, may then terminate the full REI and the full RDI. If an Ethernet packet is then being sent back to network element 704*a* by network element 704*f*, then as a source of a full path, network element 704*f* may insert a full REI and a full RDI into the associated preambles of the Ethernet packet, while network element 704*a* may terminate the full REI and the full RDI.

Within overall full path 708, a tandem connection path 712 which encompasses network elements 704*c–e* exists. Hence, when network element 704*e* is a source of tandem connection path 712, network element 704*c* may insert a TC REI and a TC RDI in the preambles of an Ethernet packet, and network element 704*c*, as the sink of tandem connection path 712, may terminate the TC REI and the TC RDI.

Figure 8:
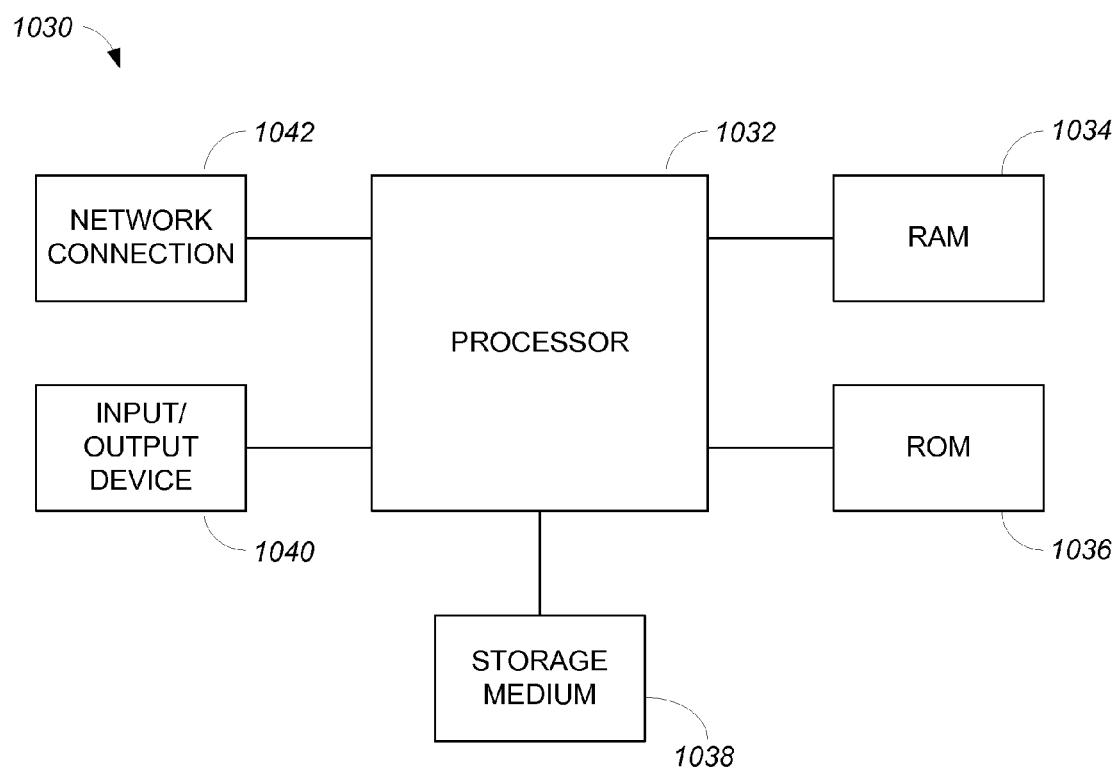
FIG. 8 is a representation of a computing device which is suitable for implementing the present invention.

FIG. 8 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the organization of bits within a preamble may be widely varied. Information may generally be stored in a preamble in substantially any suitable order, and the bits in a preamble which are used to enable tandem connection monitoring and performance monitoring may vary. Further, the number of frames or, more specifically, preambles used to substantially fully express information such as a general purpose TTI and a 'K' byte may also vary widely.

While bits corresponding to an incoming error count may generally be expressed in a single preamble and, hence, inserted into a single preamble, an incoming error count may be expressed in any number of preambles that are a part of an Ethernet packet. For instance, the incoming error count may be inserted in substantially every preamble of the Ethernet packet. Similarly, while the bits corresponding to a bit interleaved parity may be inserted into a single preamble, such bits may also be stored into any number of preambles of the Ethernet packet.

The use of preambles of Ethernet frames to store information that may be used for tandem connection monitoring and performance monitoring has generally been described as being suitable for use with Ethernet traffic or Ethernet with CDL traffic. It should be appreciated, however, that a CDL protocol is only one example of a protocol which may enable Ethernet to have a variety of operations, administration, and management capabilities that are generally available in SONET network.

In general, the steps associated with methods of providing a tandem connection and performance monitoring may be widely varied. Steps may be added, removed, altered, or reordered without departing from the spirit or the scope of the present invention. By way of example, steps associated with inserting and extracting 'K' bits may generally be added to a method of updating a preamble.

Although the present invention has generally been described as being suitable for implementation on a processing unit associated with a computing device, the present invention may be implemented using substantially any suitable mechanism or device. For example, the populating and reading of preambles of Ethernet frames may be performed using hardware which may include, but is not limited to, an application specific integrated circuit (ASIC) and a field-programmable gate array (FPGA). That is, substantially any suitable hardware may be configured to implement the various functionalities described above. Therefore, the present examples are to be considered as illustrative and not restrictive, and the invention is not to be limited to the details given herein, but may be modified within the scope of the appended claims.

What is claimed is:

1. A method for processing an Ethernet packet, the packet including at least one frame and a preamble arrangement, the preamble arrangement including at least one preamble associated with at least one frame, the method comprising:
receiving a packet from a first network element included in a network path at a second network element included in the network path;
determining whether at least one error has arisen between a source of the network path and the second network element; and
inserting a first error count indication in the preamble arrangement which substantially accounts for the at least one error when it is determined that the error has arisen between the source of the network path and the second network element.

2. The method of claim 1 further including:
monitoring a hit interleaved parity associated with a previous packet using the second network element, wherein the bit-interleaved parity is stored in the preamble arrangement.

3. The method of claim 2 wherein the bit interleaved parity is calculated and stored in the preamble arrangement by the source.

4. The method of claim 1 wherein when the second network element is a source of a tandem connection within the network path, the method further including:
inserting a second error count indication in the preamble arrangement which substantially accounts for the at least one error when it is determined that the error has arisen between the source of the network path and the second network element; and
inserting at least one of a tandem connection remote error indication and a tandem connection remote defect indication in the preamble arrangement.

5. The method of claim 1 wherein when the second network element is a sink of a tandem connection within the network path, the method further including:
identifying a number of errors between a source of the tandem connection and the second network element; and
extracting at least one of a tandem connection remote error indication and a tandem connection remote defect indication from the preamble arrangement.

6. The method of claim 1 wherein when the second network element is a sink of the network path, the method further including:
identifying a number of errors between the first network element and the second network element; and
extracting at least one of a full path remote error indication and a full path remote defect indication from the preamble arrangement.

7. The method of claim 1 wherein the preamble arrangement further includes:
a trail trace identifier; and
bits associated with performance monitoring information.

8. The method of claim 7 wherein the performance monitoring information includes one of a K1 byte, a K2 byte, and a K3 byte.

9. The method of claim 1 wherein the source of the network path is the first network element.

10. A network element suitable for processing an Ethernet packet, the packet including at least one frame and a preamble arrangement, the preamble arrangement including at least one preamble associated with at least one frame, the network element comprising:
means for receiving a packet from a first node included in a network path;
means for determining whether at least one error has arisen between a source of the network path and the network element; and
means for inserting a first error count indication in the preamble arrangement which substantially accounts for the at least one error when it is determined that the error has arisen between the source of the network path and the second network element.

11. The network element of claim 10 further including:
means for monitoring a bit interleaved parity associated with a previous packet, wherein the bit-interleaved parity is stored in the preamble arrangement.

12. The network element of claim 11 wherein the bit interleaved parity is calculated and stored in the preamble arrangement by the source.

13. The network element of claim 10 wherein when network element is a source of a tandem connection within the network path, the network element farther includes:
   means for inserting a second error count indication in the preamble arrangement which substantially accounts for the at least one error when it is determined that the error has arisen between the source of the network path and the network element; and
   means for inserting at least one of a tandem connection remote error indication and a tandem connection remote defect indication in the preamble arrangement.

14. The network element of claim 10 wherein when the network element is a sink of a tandem connection within the network path, the network element further includes:
   means for identifying a number of errors between a source of the tandem connection and the network element; and
   means for extracting at least one of a tandem connection remote error indication and a tandem connection remote defect indication from the preamble arrangement.

15. The network element of claim 10 wherein when the network element is a sink of the network path, the network element further includes:
   means for identifying a number of errors between the first node and the network element; and
   means for extracting at least one of a full path remote error indication and a full path remote defect indication from the preamble arrangement.

16. The network element of claim 10 wherein the preamble arrangement further includes:
   a trail trace identifier; and
   bits associated with performance monitoring information.

17. A network element suitable for processing an Ethernet packet, the packet including at least one frame and a preamble arrangement, the preamble arrangement including at least one preamble associated wit at least one frame, the network element comprising:
   code devices that cause a packet to be received from a first node included in a network path;
   code devices that cause a determination of whether at least one error has arisen between a source of the network path and the network element; and
   code devices that cause a first error count indication to be inserted in the preamble arrangement which substantially accounts for the at least one error when it is determined that the error has arisen between the source of the network path and the second network element.

18. The network element of claim 17 further including:
   code devices that cause a bit interleaved parity associated with a previous packet to be monitored, wherein the bit-interleaved parity is stored in the preamble arrangement.

19. The network element of claim 18 wherein the hit interleaved parity is calculated and stored in the preamble arrangement by the source.

20. The network element of claim 17 wherein when network element is a source of a tandem connection within the network path, the network element further includes:
   code devices that cause a second error count indication to be inserted in the preamble arrangement which substantially accounts for the at least one error when it is determined that the error has arisen between the source of the network path and the network element; and
   code devices that cause at least one of a tandem connection remote error indication and a tandem connection remote defect indication to be inserted in the preamble arrangement.

21. The network element of claim 17 wherein when the network element is a sink of a tandem connection within the network path, the network element further includes:
   code devices that cause a number of errors between a source of the tandem connection and the network element to he identified; and
   code devices that cause at least one of a tandem connection remote error indication and a tandem connection remote defect indication to be extracted from the preamble arrangement.

22. The network element of claim 17 wherein when the network element is a sink of the network path, the network element further includes:
   code devices that cause a number of errors between the first node and the network element to be identified; and
   code devices that cause at least one of a full path remote error indication and a full path remote defect indication to be extracted from the preamble arrangement.

23. The network element of claim 17 wherein the preamble arrangement further includes:
   a trail trace identifier, and
   bits associated with performance monitoring information.

24. A network element suitable for use in path within a network, the network element comprising:
   a receiver, the receiver being arranged to receive an Ethernet packet having a preamble arrangement, the preamble arrangement including at least one preamble associated with a frame included in the Ethernet packet, the preamble arrangement being arranged to contain a bit interleaved parity code, at least one of a remote error indication and a remote defect indication, a trail trace identifier, an error count, and performance monitoring information; and
   a processor, the processor being arranged to access the preamble arrangement to update the preamble arrangement.

25. The network element of claim 24 wherein the processor is arranged to determine a bit interleaved parity code.

26. The network element of claim 24 wherein the processor is arranged to monitor the bit interleaved parity code contained in the preamble arrangement, the processor further being arranged to detect at least one error in the path, and to store information relating to the at least one error in the path as an error count when the at least one error is detected in the path.

27. The network element of claim 24 wherein the processor is arranged to insert the at least one of the remote error indication and the remote defect indication in the preamble arrangement, the processor further being arranged to insert the trail trace identifier and the performance monitoring information in to preamble arrangement.

28. The network element of claim 24 wherein the preamble arrangement is further arranged to include information used for tandem connection monitoring.

29. The network element of claim 24 wherein the Ethernet packet is of a converged data link (CDL) protocol.

30. The network element of claim 29 wherein the preamble arrangement further includes operation, administration, and management in formation associated wit the CDL protocol.

* * * * *